S. C. BAUGHN.
Improvement in Plows.
No. 133,187.   Patented Nov. 19, 1872.
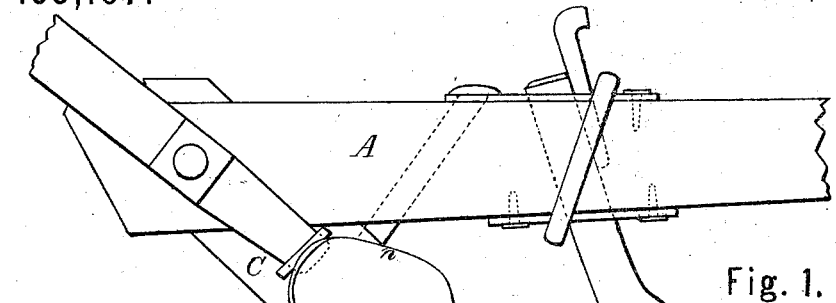
Fig. 1.
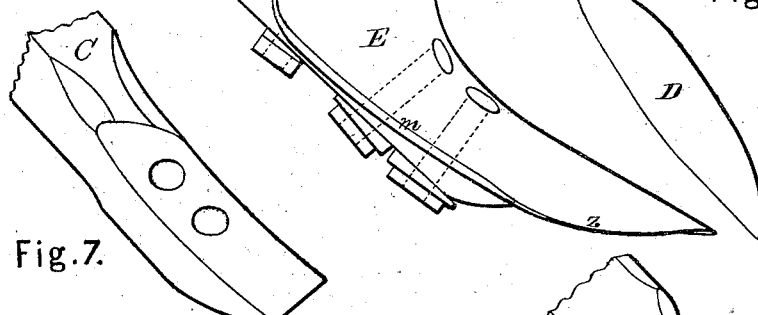
Fig. 7.
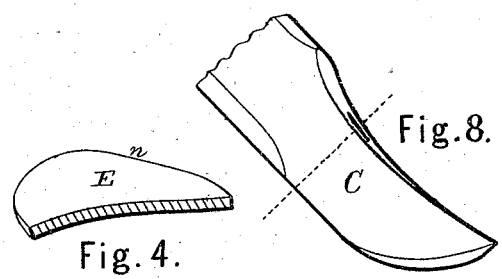
Fig. 8.
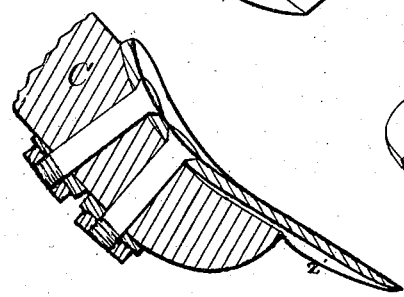
Fig. 4.
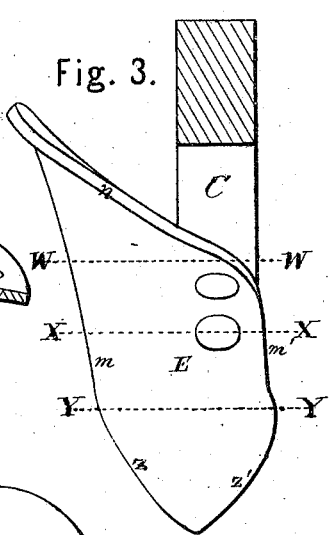
Fig. 3.
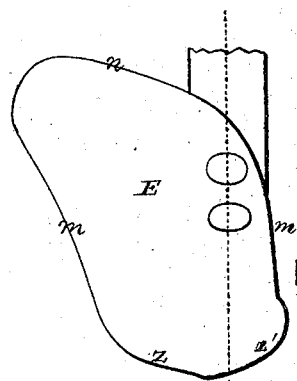
Fig. 9.
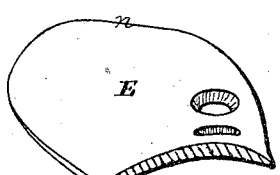
Fig. 5.
Fig. 2.
Fig. 6.
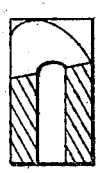
Fig. 10.
WITNESSES.
Villette Anderson.
Phil. C. Masi.
INVENTOR.
S. C. Baughn,
Chipman Hosmer & Co
Attorneys.

UNITED STATES PATENT OFFICE.

SAMUEL C. BAUGHN, OF CALHOUN, KENTUCKY.

IMPROVEMENT IN PLOWS.

Specification forming part of Letters Patent No. 133,187, dated November 19, 1872.

*To all whom it may concern:*

Be it known that I, SAMUEL C. BAUGHN, of Calhoun, in the county of McLean and State of Kentucky, have invented a new and useful Improvement in Plows, of which the following is a specification:

Figure 1 represents a side view of my invention; Fig. 2 represents a front view of the plow-plate; Fig. 3 represents a top view of the plow-plate; Figs. 4, 5, and 6 are sections, respectively, through the lines W X Y; Fig. 7 is a perspective view of the standard; Fig. 8 is a side view of the same; Fig. 9 is a longitudinal section; and Fig. 10 is a cross-section through the standard.

This invention has relation to plows for cultivating purposes; and it consists in the construction and novel arrangement of the herein-described plow-plate, having its foot, from about the center to the point, straight along its highest line, and convex from side to side, and, above the center, convex from side to side, and concave backward and upward, said plate being obliquely placed on the standards, so that at its upper part it projects from the standard on one side, and at its point it extends laterally from the standard on each side. This invention also consists in the connection with such a plow-plate of a colter whose point extends below the point of the plow-plate.

In the cultivation of potatoes and Indian corn it is often found desirable to turn the mold from the furrows toward and around the growing plants. This is usually done with an ordinary turn-plow. Aside from and in addition to throwing the earth about the plants, as above mentioned, in order to kill the weeds and secure moisture, it is required to stir and scrape the surface of the ground between the rows of plants. This is usually accomplished with that style of plow which is called a shovel. The object of this invention is to produce a suitable and convenient implement that shall serve both purposes in a satisfactory manner.

In the accompanying drawing, the letter A designates the plow-beam, and C the standard. E designates the plow-plate, and D the colter, the point of which is arranged in line with and extends slightly below the point of the plow-plate. In order that this plate shall fit the standard securely, and that the strain shall be equalized thereon, said standard is cut concave longitudinally on its front edge, and the face of this concave recess is made square to the front at its foot, or where it receives that portion of the plate which extends on each side of said standard, while at its upper part, where it receives that portion of the plate which projects to one side only of the standard, the face of the recess is turned obliquely backward on this side to correspond with the position of this portion of the plate.

The plate E is of peculiar form. The highest line of the lower or convex portion extends from the point to the bolt-holes, which are in line with said point, and situated at one side of the plate, as shown in the drawing. From the point a convex edge extends backward and upward projecting on each side of the standard. Of these convex edges forming the point of the plate the edge $z$, when the plow is in position, lies near the ground and forms, with the line of the standard or center line of the plate, a more obtuse angle than the edge $z'$. The latter edge at its junction with the edge $z$ forms nearly a right angle with said edge, and although it does not extend so far from the medium line of the plate its bend or convexity is more abrupt, so that it is brought very nearly as close to the ground as the edge $z$. The point of the plate will, therefore, work evenly in the ground as a shovel. The convex edges $z$ $z'$ terminate at about one-third the length of the plate from the point, and from thence the edges of the plate extend backward and upward nearly parallel with each other. One of these lateral edges, $m'$, extends closely along the side of the standard, while the other, $m$, is at some distance therefrom, as shown, and is much longer, the edge $m'$ bending around the upper bolt-hole and extending obliquely across the standard to join the edge $m$. From the top $n$ of the plate to the lowest bolt-hole or middle part thereof the plate is concave backward and upward, but convex laterally.

From the form of the plate, with its ridge-like prominence along the medium line and laterally-convex shape, it is evident that the soil will be broken up as it passes over its face and will be thrown about the plants in a pulverized form.

To facilitate the breaking up of the mold, and to enable this plate, which is light in form, to work its way with facility the deep-set colter D is employed. Its action is such as to cause the mold to divide readily along the prominent line of the plate. The convex edges $z$ and $z'$ are made thin and sharp.

What I claim as my invention, and desire to secure by Letters Patent, is—

The plow-plate having its lower end convex and its upper end concave, as described, and arranged for attachment to the oblique standard so as to form a combined shovel and turn plow, substantially as specified.

SAMUEL CLAIBORNE BAUGHN.

Witnesses:
WM. H. WALL,
T. C. TICKNER.